United States Patent
Yoshida et al.

(10) Patent No.: US 10,473,491 B2
(45) Date of Patent: Nov. 12, 2019

(54) ROTARY ENCODER

(71) Applicant: FANUC CORPORATION, Yamanashi (JP)

(72) Inventors: Hirosato Yoshida, Yamanashi (JP); Nobuyuki Ootake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/939,474

(22) Filed: Mar. 29, 2018

(65) Prior Publication Data

US 2018/0292239 A1    Oct. 11, 2018

(30) Foreign Application Priority Data

Apr. 7, 2017  (JP) .................................. 2017-076704

(51) Int. Cl.
  *G01D 5/347*    (2006.01)
(52) U.S. Cl.
  CPC ....... *G01D 5/3473* (2013.01); *G01D 5/34715* (2013.01)
(58) Field of Classification Search
  CPC ............. G01D 5/3473; G01D 5/34738; G01D 5/34715; G01D 5/34707; G01D 5/347
  See application file for complete search history.

(56) References Cited

U.S. PATENT DOCUMENTS 4,495,700 A  * 1/1985 Ernst .................. G01D 5/34738
                                                33/1 L
4,775,787 A    10/1988 Ushiyama
4,942,295 A  * 7/1990 Brunner ............. G01D 5/24442
                                                250/231.13

(Continued)

FOREIGN PATENT DOCUMENTS

DE     102012202683 A1    8/2013
DE     102014018521 A1    6/2015

(Continued)

OTHER PUBLICATIONS

An Office Action; "Notification of Reasons for Refusal," mailed by the Japanese Patent Office dated Jun. 12, 2018, which corresponds to Japanese Patent Application No. 2017-076704 and is related to U.S. Appl. No. 15/939,474; with partial English language translation.

(Continued)

*Primary Examiner* — John R Lee
(74) *Attorney, Agent, or Firm* — Studebaker & Brackett PC (57) ABSTRACT

A rotary encoder includes: an axis holding unit that holds a rotary axis member; a rotary slit plate that rotates around a rotary axis of the rotary axis member; a fixed slit plate that is arranged so as to face the rotary slit plate; a light emitting unit; a light receiving unit that receives the light emitted from the light emitting unit; and a fixed slit table that has a first positioning unit that is attached with the fixed slit plate and positions the fixed slit plate, and a light emitting unit holding unit that holds the light emitting unit. The first positioning unit has an abutting unit and a deformation unit. The fixed slit plate is arranged in between the abutting unit and the deformation unit while the fixed slit plate abuts to the abutting unit, by the deformation unit that has deformed.

4 Claims, 4 Drawing Sheets

(56) References Cited

U.S. PATENT DOCUMENTS

| | | | | |
|---|---|---|---|---|
| 5,708,496 A * | 1/1998 | Barnett | ............. | G01D 5/34738 250/231.13 |
| 7,649,167 B2 * | 1/2010 | Nakamura | ......... | G01D 5/34738 250/231.13 |
| 7,669,346 B2 * | 3/2010 | Madore | ............. | G01D 5/34707 33/1 PT |
| 2003/0042408 A1 * | 3/2003 | Setbacken | .......... | G01D 5/34738 250/231.13 |
| 2008/0303514 A1 * | 12/2008 | Choi | ................... | G01D 5/3473 324/207.2 |
| 2009/0282947 A1 * | 11/2009 | Powell | .............. | G01D 5/34707 74/13 C |
| 2017/0059369 A1 * | 3/2017 | Ootake | ................. | G01D 11/24 |
| 2018/0292239 A1 * | 10/2018 | Yoshida | .............. | G01D 5/3473 |

FOREIGN PATENT DOCUMENTS

| | | |
|---|---|---|
| JP | S62-019770 A | 1/1987 |
| JP | 2014-219326 A | 11/2014 |
| JP | 2015-118046 A | 6/2015 |

OTHER PUBLICATIONS

An Office Action mailed by the German Patent and Trade Mark Office dated Jul. 17, 2019, which corresponds to German Patent Application No. 102018002493.9 and is related to U.S. Appl. No. 15/939,474.

\* cited by examiner

ROTARY ENCODER

This application is based on and claims the benefit of priority from Japanese Patent Application No. 2017-076704, filed on Apr. 7, 2017, the content of which is incorporated herein by reference.

BACKGROUND OF THE INVENTION

Field of the Invention

The present invention relates to a rotary encoder including: a rotary slit plate that rotates around a rotary axis; a fixed slit plate that is arranged so as to face the rotary slit plate; and a fixed slit table attached with the fixed slit plate.

Related Art

A conventional rotary encoder is known, the encoder including: a rotary slit plate that rotates around a rotary axis; a fixed slit plate that is arranged so as to face the rotary slit plate; a fixed slit table attached with the fixed slit plate; a light emitting unit that emits light to the fixed slit plate and the rotary slit plate; and a light receiving unit that receives light emitted from the light emitting unit. Arrangement of the fixed slit plate, the light emitting unit, and the light receiving unit in such rotary encoder affects detection accuracy and resolution of the rotary encoder. Thus, positioning in a horizontal direction and a height direction need to be performed.

On the other hand, a rotary encoder that regulates a position in a horizontal direction, of the fixed slit plate by a projection portion to perform positioning in the horizontal direction is known (for example, see Patent Document 1).
Patent Document 1: Japanese Unexamined Patent Application, Publication No. 2014-219326

SUMMARY OF THE INVENTION

In a conventional rotary encoder, there is a case where a fixed slit table is formed of a resin material, and a projection provided in an upper surface of the fixed slit table is crushed in a height direction by a fixed slit plate to position the fixed slit plate in a predetermined height direction. When the projection of the fixed slit table is crushed in the height direction by the fixed slit plate, the fixed slit table sometimes moves in a horizontal direction. Thus, after the fixed slit plate is positioned in the predetermined height direction, positioning in the horizontal direction is performed separately. Therefore, a work of attaching the fixed slit plate to the fixed slit table is troublesome. Accordingly, a rotary encoder capable of easily positioning a fixed slit plate is desired.

An object of the present invention is to provide a rotary encoder capable of easily positioning a fixed slit plate in the rotary encoder including a rotary slit plate and a fixed slit plate.

(1) A rotary encoder (for example, a rotary encoder 1 described later) of the present invention includes: an axis holding unit (for example, a bearing holding member 25 described later) that holds a rotary axis member (for example, a shaft 3 described later); a rotary slit plate (for example, a rotary slit plate 4 described later) that is connected to the rotary axis member and rotates around a rotary axis (for example, a rotary axis J described later) of the rotary axis member; a fixed slit plate (for example, a fixed slit plate 5 described later) that is arranged so as to face the rotary slit plate; a light emitting unit (for example, a light emitting unit 6 described later) that emits light to the fixed slit plate and the rotary slit plate; a light receiving unit (for example, a light receiving unit 7 described later) that receives the light emitted from the light emitting unit; a fixed slit table (for example, a bottom plate 23 described later) that has a first positioning unit (for example, a regulating unit 32 described later) that is attached with the fixed slit plate and positions the fixed slit plate, and a light emitting unit holding unit (for example, a light emitting unit holding hole unit 311 described later) that holds the light emitting unit. The first positioning unit has: an abutting unit (for example, an abutting unit 33 described later) to which first end portions (for example, a first short side end portion 52a and a first long side end portion 53a described later) of the fixed slit plate abut and that substantially does not deform, and a deformation unit (for example, a deformation unit 34 described later) that is arranged so as to face the abutting unit and deforms by abutting of second end portions (for example, a second short side end portion 52b and a second long side end portion 53b described later) of the fixed slit plate. The fixed slit plate is arranged in between the abutting unit and the deformation unit in a state where the fixed slit plate abuts to the abutting unit, by the deformation unit that has deformed.

(2) In the rotary encoder described in (1), the axis holding unit and the fixed slit table are formed of different members. The fixed slit table may have a second positioning unit (for example, a shaft positioning unit 24 described later) that positions the rotary axis of the rotary axis member.

(3) In the rotary encoder described in (1), the fixed slit table may have a third positioning unit (for example, a printed board positioning unit 233 described later) that positions the light receiving unit.

According to the present invention, a rotary encoder capable of easily positioning a fixed slit plate in the rotary encoder including a rotary slit plate and the fixed slit plate, can be provided.

BRIEF DESCRIPTION OF THE DRAWINGS

FIG. 3 is a plan view showing a state where a fixed slit plate is arranged in the bottom plate of the first embodiment of the present invention.

DETAILED DESCRIPTION OF THE INVENTION

Embodiments of the present invention will be described below with reference to drawings. The components that are common with the first embodiment are added with the same numerals and description thereof is omitted, in description of second and later embodiments.

First Embodiment

Figure 1:
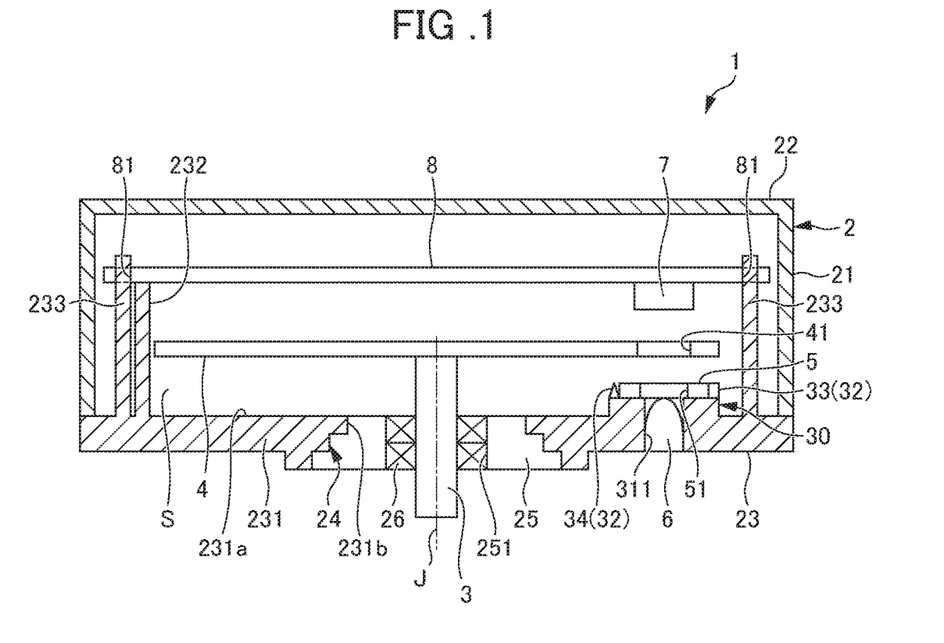
FIG. 1 is a diagram showing a configuration of a rotary encoder of a first embodiment of the present invention.
Figure 2A:
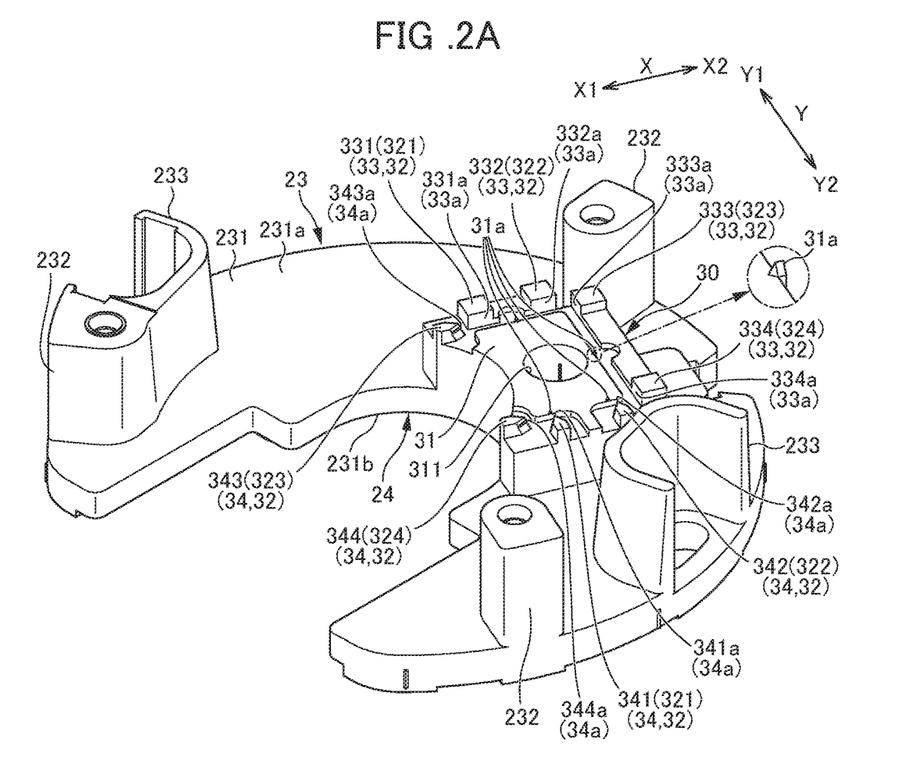
FIG. 2A is a perspective view viewing a bottom plate of the first embodiment of the present invention from an upper side.
Figure 2B:
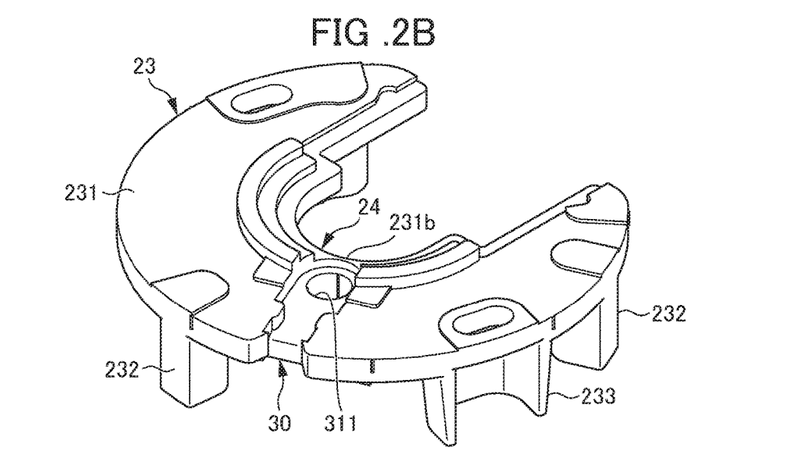
FIG. 2B is a perspective view viewing the bottom plate of the first embodiment of the present invention from a lower side.
Figure 4:
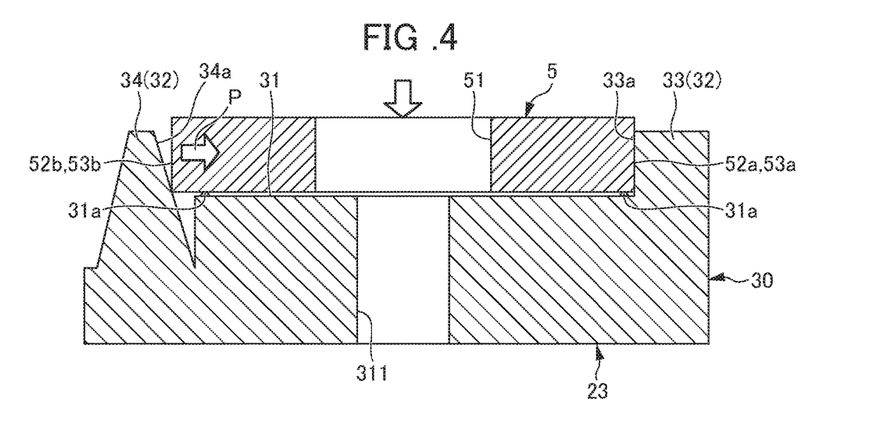
FIG. 4 is a cross sectional view schematically showing a case where the fixed slit plate is arranged in the bottom plate.

A rotary encoder 1 according to a first embodiment will be described. FIG. 1 is a diagram showing a configuration of the rotary encoder 1 of a first embodiment of the present invention. FIG. 2A is a perspective view viewing a bottom plate 23 of the first embodiment of the present invention from an upper side. FIG. 2B is a perspective view viewing the bottom plate 23 of the first embodiment of the present invention from a lower side. FIG. 3 is a plan view showing a state where a fixed slit plate 5 is arranged in the bottom plate 23 of the first embodiment of the present invention. FIG. 4 is a cross sectional view schematically showing a case where the fixed slit plate 5 is arranged in the bottom plate 23. In description of the present embodiment, a vertical direction in a case where a shaft 3 of the rotary encoder 1 is arranged to extend in the vertical direction (see FIG. 1) is referred to as an "up and down direction" and a horizontal direction is referred to as a "horizontal direction". In the up and down direction, a side where the rotary slit plate 4 is arranged is referred to as "up" and a side where the fixed slit plate 5 is arranged is referred to as "down".

As shown in FIG. 1, the rotary encoder 1 of the present embodiment includes a housing 2, a shaft 3 (rotary axis member), a rotary slit plate 4, a fixed slit plate 5, a light emitting unit 6, a light receiving unit 7, and a printed board 8 mounted with the light receiving unit 7. The rotary encoder 1 detects rotation (rotation speed and position) of a rotary body (not shown). Examples of the rotary body include a servo motor, and the like.

The housing 2 has a cylinder unit 21 that is a cylindrical shape extending in the up and down direction, an upper plate unit 22 that closes an upper surface of the cylinder unit 21, and a bottom plate 23 (fixed slit table) that closes a bottom surface of the cylinder unit 21. An accommodation space S is formed in an inside of the housing 2. The cylinder unit 21 and the upper plate unit 22 are integrally formed. The cylinder unit 21 is fixed to an upper surface 231a of a bottom plate body 231 of the bottom plate 23 by a bolt (not shown). A bearing holding member 25 (axis holding unit) having an axis through hole 251 is attached to an opening 231b formed in the center of the bottom plate 23. A bearing 26 is mounted to the axis through hole 251.

The bottom plate 23 has the bottom plate body 231, a fixed slit plate attachment unit 30, a plurality of printed board support members 232, and a plurality of printed board positioning units 233 (third positioning unit). The bottom plate 23 is formed of a resin material.

As shown in FIG. 2, the bottom plate body 231 is formed to be a plate shape that is a substantially C-shape in a plan view. A shaft positioning unit 24 (second positioning unit) that is an arc shape is formed in an inner edge of an inside of a radial direction of the bottom plate body 231.

As shown in FIG. 1 to FIG. 2B, the shaft positioning unit 24 is formed in a stepped form in an inner edge of the opening 231b in the bottom plate body 231, and extends in a circumferential direction along the opening 231b. The bearing holding member 25 is attached to the shaft positioning unit 24 in the inner edge of the bottom plate body 231 (see FIG. 1). In the present embodiment, the bearing holding member 25 is formed of a different member from that of the bottom plate 23 of the housing 2. The bearing holding member 25 is formed of, for example, a metal material. The bearing holding member 25 is formed of a metal material so that high strength can be secured.

An outer edge of the bearing holding member 25 is formed in a stepped form corresponding to a portion of the stepped form of the shaft positioning unit 24. Thereby, the bearing holding member 25 is attached to an inner edge of the opening 231b in the bottom plate body 231, in a state of being positioned in the shaft positioning unit 24. The bearing 26 is attached to an inside of the shaft positioning unit 24.

As shown in FIG. 1, the shaft 3 extends in the up and down direction along a rotary axis J. The shaft 3 is mounted to an inside of the bearing 26, and is supported to the bearing 26 so as to be rotatable around the rotary axis J. The bearing 26 is held in the bearing holding member 25. That is, the shaft 3 is held in the bearing holding member 25 via the bearing 26.

The bearing holding member 25 is positioned in the shaft positioning unit 24 of the bottom plate body 231, and thereby, the shaft 3 is positioned in a horizontal direction. In other words, the bearing holding member 25 positions the rotary axis J of the shaft 3 in the horizontal direction. A lower end portion of the shaft 3 projects downward from the housing 2. A rotary axis (not shown) such as a servo motor is coupled to the lower end portion of the shaft 3. An upper end portion of the shaft 3 is arranged in the housing 2. The rotary slit plate 4 is connected to the upper end portion of the shaft 3.

The rotary slit plate 4 is arranged in the accommodation space S in the housing 2. The rotary slit plate 4 is formed to be a circle plate shape. The upper end portion of the shaft 3 is attached to the center of a lower surface of the rotary slit plate 4. The rotary slit plate 4 rotates around the rotary axis J of the shaft 3 integrally with the shaft 3 in the accommodation space S in the housing 2. A slit unit 41 having a predetermined pattern is provided in the rotary slit plate 4.

As shown in FIG. 1 and FIG. 3, the fixed slit plate 5 is attached to an upper portion of the fixed slit plate attachment unit 30 (described later), in a position that is spaced from the rotary axis J to the radial direction in the bottom plate 23 of the housing 2. The fixed slit plate attachment unit 30 is formed so as to project from the upper surface 231a of the bottom plate body 231 of the housing 2 upward. In a state where the fixed slit plate 5 is attached to the fixed slit plate attachment unit 30, the fixed slit plate 5 is spaced downward to the rotary slit plate 4, and is arranged in parallel to and facing the rotary slit plate 4.

As shown in FIG. 3, the fixed slit plate 5 is formed to be, for example, a rectangular plate shape. In the present embodiment, for example, the fixed slit plate 5 has a first short side end portion 52a forming one short side, a second short side end portion 52b forming the other short side opposite from the first short side end portion 52a, a first long side end portion 53a forming one long side, and a second long side end portion 53b forming the other long side opposite from the first long side end portion 53a.

A slit unit 51 having a predetermined pattern is provided in the fixed slit plate 5, corresponding to the slit unit 41 of the rotary slit plate 4. The slit unit 51 of the fixed slit plate 5 is formed to be, for example, an arc shape around the rotary axis J. As shown in FIG. 1, the light emitting unit 6 is arranged downward to the slit unit 51.

The light emitting unit 6 is held in a light emitting unit holding hole 121 (light emitting unit holding unit) provided in the fixed slit plate attachment unit 30 of the bottom plate 23 of the housing 2. The light emitting unit 6 is composed of a light emitting element, and is, for example, a light emitting diode. The light emitting unit 6 is arranged so as to face the slit unit 51 of the fixed slit plate 5, and emits light to the slit unit 51 of the fixed slit plate 5, and the rotary slit plate 4 arranged above the fixed slit plate 5.

The printed board 8 is arranged so as to be parallel with and face the rotary slit plate 4, above the rotary slit plate 4. The light receiving unit 7 is mounted in a position spaced from the rotary axis J to the radial direction, in a lower surface of the printed board 8.

The light receiving unit 7 is arranged so as to face the light emitting unit 6 via the fixed slit plate 5 and the rotary slit plate 4. The light receiving unit 7 is arranged by being mounted to the printed board 8. The light receiving unit 7 is composed of a light receiving element. The light receiving unit 7 receives the light emitted from the light emitting unit 6, via the slit unit 51 of the rotary slit plate 5, and the slit unit 41 of the rotary slit plate 4.

The printed board 8 is supported by a plurality of printed board supporting members 232 erected from the upper surface 231a of the bottom plate 23. The position in the horizontal direction of the printed board 8 is positioned by the printed board positioning unit 233 erected from the upper surface 231a of the bottom plate 23. The printed board positioning unit 233 performs positioning in the horizontal direction of the light receiving unit 7 mounted in the printed board 8. In the present embodiment, for example, the printed board positioning unit 233 is engaged to a notch part 81 (see FIG. 1) provided in the printed board 8, and thereby, the position in the horizontal direction of the printed board 8 is positioned.

As shown in FIG. 3, the fixed slit plate 5 is attached to an upper portion of the fixed slit plate attachment unit 30. As shown in FIG. 2A, the fixed slit plate attachment unit 30 is formed so as to project upward from the upper surface 231a of the bottom plate body 231, in a closed portion of an arc shaped portion of a substantially C shape of the bottom plate body 231. The fixed slit plate attachment unit 30 is formed in a substantially rectangular shape in a plan view.

In description of the present embodiment, in the fixed slit plate attachment unit 30, a direction that is a short side direction of the fixed slit plate attachment unit 30 in the horizontal direction, and crosses with an extending direction of the arc shaped portion of the bottom plate body 231, is a first direction X. One side (an inner side of the arc shaped portion of the bottom plate body 231, and a diagonally lower left side of FIG. 2A) of the X direction is a X1 side, and the other side (an outer side of the arc shaped portion of the bottom plate body 231, and a diagonally upper right side of FIG. 2A) of the X direction is a X2 side. A direction that is a long side direction of the fixed slit plate attachment unit 30, and is orthogonal to the first direction X is a second direction Y. One side (a diagonally upper left side of FIG. 2A) of the second direction Y is a Y1 side, and the other side (a diagonally lower right side of FIG. 2A) of the Y direction is a Y2 side.

As shown in FIG. 2A, the fixed slit plate attachment unit 30 has an attachment upper surface 31, four projections 31a, and four sets of regulating units 32 (first positioning unit).

The attachment upper surface 31 is formed in a plain surface shape extending in the horizontal direction, in an upper position from the upper surface 231a of the bottom plate body 231. The fixed slit plate 5 is arranged in an upper portion of the attachment upper surface 31. The four projections 31a projecting upward from the attachment upper surface 31 and having sharp upper ends are provided in the attachment upper surface 31. The four projections 31a are arranged in four positions near an outer edge of the attachment upper surface 31. The four projections 31a are parts of the bottom plate 23, and are formed of a resin material. The fixed slit plate 5 is moved from upward to downward, and the fixed slit plate 5 is arranged in the upper portion of the attachment upper surface 31. Thereby, the four projections 31a are crushed by a lower surface of the fixed slit plate 5. Thereby, the fixed slit plate 5 is arranged in a position of a predetermined height direction.

A light emitting unit holding hole unit 311 (light emitting unit holding unit) extending through in the up and down direction, is formed in the center of the attachment upper surface 31. The light emitting unit 6 is arranged in the light emitting unit holding hole unit 311. The light emitting holding hole unit 311 holds the light emitting unit 6. The four sets of regulating units 32 are provided in the periphery of the attachment upper surface 31.

Each of the four sets of regulating units 32 performs positioning in the horizontal direction of the fixed slit plate 5. Each of the four sets of regulating units 32 has an abutting unit 33, and a deformation unit 34 arranged so as to face the abutting unit 33 in the horizontal direction. In the present embodiment, in the four sets of regulating units 32, the shapes of the abutting unit 33 and the deformation unit 34 are different only in positions and directions in which they are provided, and have the same shape.

As shown in FIG. 3 and FIG. 4, the abutting unit 33 is formed to be a rectangular shape in a plan view. The abutting unit 33 has an abutting surface 33a facing the deformation unit 34. The abutting surface 33a is formed to be a plain surface shape extending in a vertical direction.

When the fixed slit plate 5 is attached to the fixed slit plate attachment unit 30, the abutting surface 33a is abutted by one end portion (first short side end portion 52a, first long side end portion 53a) (first end portions) of the fixed slit plate 5. Since the abutting unit 33 is formed in a plain surface shape extending in the vertical direction, even when the fixed slit plate 5 is moved from upward to downward to be arranged in the attachment upper surface 31, the abutting unit 33 does not receive the force from the fixed slit plate 5 moving in the vertical direction, and substantially does not deform. As shown in FIG. 4, when the fixed slit plate 5 is attached to the fixed slit plate attachment unit 30, the abutting unit 33 is pushed by a stress P due to deformation of the deformation unit 34. However, since being formed in a surface shape extending in the vertical direction, the abutting unit 33 substantially does not deform.

As shown in FIG. 3 and FIG. 4, the deformation unit 34 is arranged so as to face the abutting surface 33a of the abutting unit 33 in the horizontal direction. A portion in the abutting unit 33 side of the deformation unit 34 is formed in a triangle shape having an inclined top portion 34a, in a plan view. The inclined top portion 34a faces the abutting surface 33a of the abutting unit 33. A tip end of the inclined top portion 34a in a direction facing the abutting unit 33, is sharp in an acute angle and projects, in a plan view. As shown in FIG. 4, the inclined top portion 34a extends so as to incline downward as extending to the abutting surface 33a, in the up and down direction.

When the fixed slit plate 5 is attached to the fixed slit plate attachment unit 30, the inclined top portion 34a deforms by being abutted by the other end portions (second short side end portion 52b, second long side end portion 53b) (second end portions) of the fixed slit plate 5. Specifically, the inclined top portion 34a of the deformation unit 34 is formed of a resin material. The inclined top portion 34a has an inclined portion, and a tip end being sharp in an acute angle and projecting. When the fixed slit plate 5 is pushed against the inclined top portion 34a from an upper side, the inclined top portion 34a plastically deforms and dents. Thereby, when the fixed slit plate 5 is arranged in between the abutting unit 33 and the deformation unit 34, the fixed slit plate 5 is abutted to the abutting unit 33 by the stress P due to the deformation of the deformation unit 34. In this way, the fixed slit plate 5 is arranged in between the abutting unit 33 and the deformation unit 34 in a state where the fixed slit plate 5 is abutted to the abutting unit 33 by the deformation unit 34 that has deformed.

In the present embodiment, as shown in FIG. 2A and FIG. 3, the four sets of regulating units 32 (first regulating unit 321, second regulating unit 322, third regulating unit 323, and fourth regulating unit 324) are composed of the first regulating unit 321 (first abutting unit 331 and first deformation unit 341), the second regulating unit 322 (second abutting unit 332 and second deformation unit 342), the third regulating unit 323 (third abutting unit 333 and third deformation unit 343), and the fourth regulating unit 324 (fourth abutting unit 334 and fourth deformation unit 344). In the present embodiment, when distinguishing is not necessary, the components are simply described as the "regulating unit 32", "abutting unit 33", and "deformation unit 34".

The first regulating unit 321 has the first abutting unit 331, and the first deformation unit 341 arranged so as to face the first abutting unit 331. The first abutting unit 331 is arranged in the X1 side of the first direction X in the end portion side of the Y1 side of the second direction Y in the upper portion of the fixed slit plate attachment unit 30. An abutting surface 331a of the first abutting unit 331 faces the Y2 side of the second direction Y. The first deformation unit 341 is arranged in the X1 side of the first direction X in the end portion side of the Y2 side of the second direction Y in the upper portion of the fixed slit plate attachment unit 30. An inclined top portion 341a of the first deformation unit 341 faces the Y1 side of the second direction Y. The fixed slit plate 5 is arranged in between the first abutting unit 331 and the first deformation unit 341, and thereby, the first regulating unit 321 regulates the movement of the fixed slit plate 5 in the second direction Y.

The second regulating unit 322 has the second abutting unit 332, and the second deformation unit 342 arranged so as to face the second abutting unit 332. The second abutting unit 332 is arranged in the X2 side of the first direction X in the end portion side of the Y1 side of the second direction Y in the upper portion of the fixed slit plate attachment unit 30. An abutting surface 332a of the second abutting unit 332 faces the Y2 side of the second direction Y. The second deformation unit 342 is arranged in the X2 side of the first direction X in the end portion side of the Y2 side of the second direction Y in the upper portion of the fixed slit plate attachment unit 30. An inclined top portion 342a of the second deformation unit 342 faces the Y1 side of the second direction Y. The fixed slit plate 5 is arranged in between the second abutting unit 332 and the second deformation unit 342, and thereby, the second regulating unit 322 regulates the movement of the fixed slit plate 5 in the second direction Y.

The third regulating unit 323 has the third abutting unit 333, and the third deformation unit 343 arranged so as to face the third abutting unit 333. The third abutting unit 333 is arranged in the X2 side of the first direction X in the end portion side of the Y1 side of the second direction Y in the upper portion of the fixed slit plate attachment unit 30. An abutting surface 333a of the third abutting unit 333 faces the X1 side of the first direction X. The third deformation unit 343 is arranged in the X1 side of the first direction X in the end portion side of the Y1 side of the second direction Y in the upper portion of the fixed slit plate attachment unit 30. An inclined top portion 343a of the third deformation unit 343 faces the X2 side of the first direction X. The fixed slit plate 5 is arranged in between the third abutting unit 333 and the third deformation unit 343, and thereby, the third regulating unit 323 regulates the movement of the fixed slit plate 5 in the first direction X.

The fourth regulating unit 324 has the fourth abutting unit 334, and the fourth deformation unit 344 arranged so as to face the fourth abutting unit 334. The fourth abutting unit 334 is arranged in the X2 side of the first direction X in the end portion side of the Y2 side of the second direction Y in the upper portion of the fixed slit plate attachment unit 30. An abutting surface 334a of the fourth abutting unit 334 faces the X1 side of the first direction X. The fourth deformation unit 344 is arranged in the X1 side of the first direction X in the end portion side of the Y2 side of the second direction Y in the upper portion of the fixed slit plate attachment unit 30. An inclined top portion 344a of the fourth deformation unit 344 faces the X2 side of the first direction X. The fixed slit plate 5 is arranged in between the fourth abutting unit 334 and the fourth deformation unit 344, and thereby, the fourth regulating unit 324 regulates the movement of the fixed slit plate 5 in the first direction X.

When the fixed slit plate 5 is attached to the fixed slit plate attachment unit 30, in a state where the fixed slit plate 5 is arranged in between the abutting surface 33a (331a, 332a, 333a, 334a) of the abutting unit 33 (first abutting unit 331, second abutting unit 332, third abutting unit 333, and fourth abutting unit 334) and the inclined top portion 34a (341a, 342a, 343a, 344a) of the deformation unit 34 (first deformation unit 341, second deformation unit 342, third deformation unit 343, fourth deformation unit 344), the regulating unit 32 (first regulating unit 321, second regulating unit 322, third regulating unit 323, fourth regulating unit 324) configured as above, causes the fixed slit plate 5 to abut to the abutting unit 33 (first abutting unit 331, second abutting unit 332, third abutting unit 333, and fourth abutting unit 334) by the stress of deformation of the deformation unit 34 (first deformation unit 341, second deformation unit 342, third deformation unit 343, fourth deformation unit 344) to regulate, and thereby, fixes the fixed slit plate 5.

When the fixed slit plate 5 is attached to the fixed slit plate attachment unit 30 configured as above, as shown in FIG. 4, the fixed slit plate 5 is moved from upward to downward of the fixed slit plate attachment unit 30, and is arranged in the attachment upper surface 31 of the fixed slit plate attachment unit 30, and the fixed slit plate 5 is moved so as to be arranged in between the abutting unit 33 and the deformation unit 34 of the regulating unit 32. The deformation unit 34 is deformed in a state where the four projections 31a (see FIG. 2A) formed in the attachment upper surface 31 of the fixed slit plate attachment unit 30 are crushed, and are abutted to the abutting unit 33. The fixed slit plate 5 is arranged in between the abutting unit 33 and the deformation unit 34 in a state where the fixed slit plate 5 is abutted to the abutting unit 33 by the deformation unit 34 that has deformed.

Accordingly, the fixed slit plate 5 is arranged by crushing the four projections 31a in the attachment upper surface 31 of the fixed slit plate attachment unit 30, and thereby, the fixed slit plate 5 can be positioned in a predetermined height direction. In a state where the fixed slit plate 5 is sandwiched between the abutting unit 33 and the deformation unit 34, one end portions (first short side end portion 52a, first long side end portion 53a) (first end portions) of the fixed slit plate 5 abut to the abutting surface 33a of the abutting unit 33, and the other end portions (second short side end portion 52b, second long side end portion 53b) (second end portion) of the fixed slit plate 5 abut to the inclined top portion 34a of the deformation unit 34, and thereby, the positioning in the horizontal direction of the fixed slit plate 5 is performed. Thus, the fixed slit plate 5 can be easily attached to the fixed slit plate attachment unit 30 in a state where the fixed slit plate 5 is positioned in the predetermined height direction and positioning in the horizontal direction of the fixed slit plate 5 has been performed.

In the present embodiment, positioning in the horizontal direction of the shaft 3 attached to the bottom plate 23 of the housing 2 is performed by the shaft positioning unit 24. Thereby, positioning in the horizontal direction of the rotary slit plate 4 attached to the upper end portion of the shaft 3 is performed. Positioning in the horizontal direction of the light receiving unit 7 mounted to the printed board 8 is performed by the printed board positioning unit 233. Positioning in the horizontal direction of the light emitting unit 6 is performed by the light emitting unit holding unit 311. Thus, according to the present embodiment, positioning accuracy of the fixed slit plate 5, the rotary slit plate 4, the light emitting unit 6, and the light receiving unit 7 can be improved. Thereby, the rotary detection accuracy by the rotary encoder 1 can be improved.

By the rotary encoder 1 configured as above, the light from the light emitting unit 6 is emitted as parallel light that is parallel to the rotary axis J via the slit unit 51 of the fixed slit plate 5, and emitted to the rotary slit plate 4. The light emitted to the rotary slit plate 4 passes the slit unit 41 of the rotary slit plate 4 corresponding to the rotation of the shaft 3, or does not pass and is blocked. The light that has passed the slit unit 41 of the rotary slit plate 4 is received by the light receiving unit 7 as an on/off signal. Thereby, the light receiving unit 7 outputs a signal corresponding to the rotation of the shaft 3. Accordingly, the rotary encoder 1 can detect the rotation (rotation speed and position) of a servo motor (not shown) coupled to the shaft 3.

By the rotary encoder 1 of the first embodiment including the configuration above, the effect below is exhibited. The rotary encoder 1 of the present embodiment includes: the bearing holding member 25 that holds the shaft 3; the rotary slit plate 4 that rotates around the rotary axis J of the shaft 3; the fixed slit plate 5 that is arranged so as to face the rotary slit plate 4; the light emitting unit 6; the light receiving unit 7 that receives the light emitted from the light emitting unit 6; and the bottom plate 23 that has the regulating unit 32 that positions the fixed slit plate 5, and the light emitting unit holding hole unit 311 that holds the light emitting unit 6. The regulating unit 32 has: the abutting unit 33 to which the first short side end portion 52a and the first long side end portion 53a of the fixed slit plate 5 abut and that substantially does not deform, and a deformation unit 34 that is arranged so as to face the abutting unit 33 and deforms by abutting of the second short side end portion 52b, and the second long side end portion 53b of the fixed slit plate 5. The fixed slit plate 5 is arranged in between the abutting unit 33 and the deformation unit 34 in a state where the fixed slit plate 5 is abutted to the abutting unit 33, by the deformation unit 34 that has deformed.

Thus, the fixed slit plate 5 is arranged in the attachment upper surface 31 of the fixed slit plate attachment unit 30, and thereby, the fixed slit plate 5 can be positioned in the predetermined height direction. Positioning in the horizontal direction of the fixed slit plate 5 can be performed by the abutting unit 33 and the deformation unit 34. Accordingly, positioning in the horizontal direction of the fixed slit plate 5 can be easily performed while the fixed slit plate 5 is positioned in the predetermined height direction. The light emitting unit holding hole unit 311 is formed in the bottom plate 23, and thereby, the bottom plate 23 and the light emitting unit holding hole unit 311 are integrally formed. Thus, correct positioning of the light emitting unit 6 held in the light emitting unit holding hole unit 311 and the fixed slit plate 5 can be performed.

In the present embodiment, the bottom plate 23 has the shaft positioning unit 24 that positions the rotary axis J of the shaft 3. Thus, positioning in the horizontal direction of the rotary slit plate 4 attached to the upper end portion of the shaft 3 can be easily performed.

The bearing holding member 25 and the bottom plate 23 are separated members. Thus, for example, the bearing holding member 25 can have high strength by forming the bearing holding member 25 from a metal material, and the light emitting unit holding hole unit 311 holding the light emitting unit 6 can be formed of an insulating material by forming the bottom plate 23 from a resin material. Since the bearing holding member 25 and the bottom plate 23 are separated members, the bearing holding member 25 need not be provided by machining the bottom plate 23. Thus, machining of the bearing holding member 25 can be omitted, in comparison with when the bearing holding member 25 and the bottom plate 23 are integrally formed. Thus, the bottom plate 23 can be easily formed.

In the present embodiment, the bottom plate 23 has the printed board positioning unit 233 that positions the light receiving unit 7. Thus, positioning in the horizontal direction of the light receiving unit 7 mounted in the printed board 8 can be easily performed.

Second Embodiment

Figure 5:
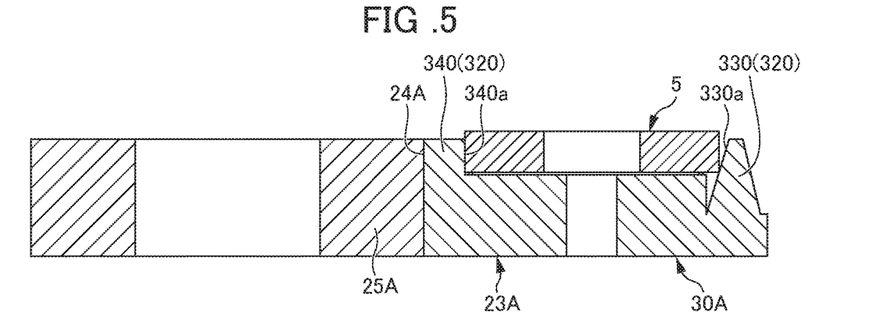
FIG. 5 is a cross sectional view schematically showing a bottom plate of a housing of a second embodiment of the present invention.

A second embodiment will be described. FIG. 5 is a cross sectional view schematically showing a bottom plate 23A of a housing 2 of the second embodiment of the present invention. The second embodiment is different from the first embodiment in a feature that a shaft positioning unit 24A (second positioning unit) is provided in a rear surface of an abutting unit 340 of a regulating unit 320. In description of a third embodiment, the similar configurations to those of the first embodiment will not be described.

As shown in FIG. 5, in the bottom plate 23A of the housing 2 of the second embodiment, the regulating unit 320 has the abutting unit 340 and a deformation unit 330. The shaft positioning unit 24A is formed in an opposite side surface (rear surface) from an abutting surface 340a in the abutting unit 340. The shaft positioning unit 24A has a plain surface shaped portion extending vertically. A bearing holding member 25A (bearing holding unit) is attached to the shaft positioning unit 24A. The bottom plate 23A of the housing 2 is formed of a resin material. The bearing holding member 25A is formed of a metal member.

According to the second embodiment, the shaft positioning unit 24A (second positioning unit) is provided in an opposite side surface from the abutting surface 340a of the abutting unit 340 of the regulating unit 320. Thus, the bearing holding member 25A is positioned to the shaft positioning unit 24A, and thereby, the strength of the abutting unit 340 of the regulating unit 320 can be higher. Particularly, when the bearing holding member 25A is formed of a metal material, the strength of the abutting unit 340 of the regulating unit 320 can be further higher. Thereby, the strength when the fixed slit plate 5 is abutted to the abutting surface 340a of the abutting unit 340 of the regulating unit 320 can be further higher. Accordingly, positioning in the horizontal direction of the fixed slit plate 5 can be further accurately performed.

Third Embodiment

Figure 6:
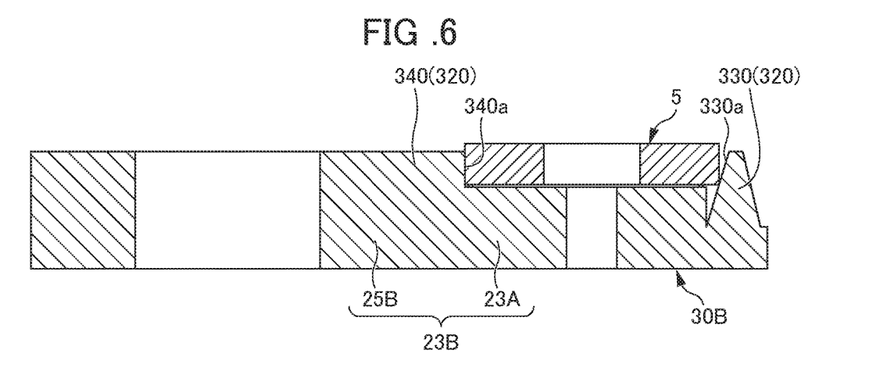
FIG. 6 is a cross sectional view schematically showing a bottom plate of a housing of a third embodiment of the present invention.

A third embodiment will be described. FIG. 6 is a cross sectional view schematically showing a bottom plate 23B of a housing 2 of the third embodiment of the present invention. As shown in FIG. 6, in the bottom plate 23B of the third embodiment, the bottom plate 23A of the second embodiment and a bearing holding member 25B are integrally configured. That is, the present invention is not limited to the configuration in which the bearing holding member 25 (25A) and the bottom plate 23 (23A) are configured as separated bodies, as the first embodiment and the second embodiment described above. As shown in FIG. 6, in the bottom plate 23B of the third embodiment, the bottom plate 23A of the second embodiment and the bearing holding member 25B may be integrally configured. For example, the bearing holding member 25B of the third embodiment is not formed of a metal material, but a resin material, and the bearing holding member 25B is formed as a part of the bottom plate 23B. That is, the entire bottom plate 23B is formed of a resin material.

The present invention is not limited to the embodiments described above, and includes variations and modifications in a scope in which the object of the present invention can be achieved. For example, in the first embodiment, four sets of regulating units 32 are provided. However, the configuration is not limited thereto. For example, one set, two sets, or three sets of the regulating units 32 may be provided, or five or more sets may be provided.

EXPLANATION OF REFERENCE NUMERALS

1 Rotary encoder
3 Shaft (rotary axis member)
4 Rotary slit plate
5 Fixed slit plate
6 Light emitting unit
7 Light receiving unit
23 Bottom plate (fixed slit table)
24 Shaft positioning unit (second positioning unit)
25 Bearing holding member (axis holding unit)
32 Regulating unit (first positioning unit)
33 Abutting unit
34 Deformation unit
52a One end portion, first short side end portion (first end portion)
53a One end portion, first long side end portion (first end portion)
52b Other end portion, second short side end portion (second end portion)
53b Other end portion, second long side end portion (second end portion)
233 Printed board positioning unit (third positioning unit)
311 Light emitting unit holding hole unit (light emitting unit holding unit)
J Rotary axis

What is claimed is:

1. A rotary encoder comprising:
an axis holding unit that holds a rotary axis member;
a rotary slit plate that is connected to the rotary axis member and rotates around a rotary axis of the rotary axis member;
a fixed slit plate that is arranged so as to face the rotary slit plate;
a light emitting unit that emits light to the fixed slit plate and the rotary slit plate;
a light receiving unit that receives the light emitted from the light emitting unit; and
a fixed slit table that has a first positioning unit that is attached with the fixed slit plate and positions the fixed slit plate, and a light emitting unit holding unit that holds the light emitting unit,
the first positioning unit having
an abutting unit to which a first side surface of the fixed slit plate abuts and that substantially does not deform, and
a deformation unit that is arranged so as to face the abutting unit, has a tip being formed with a sharp end in a direction facing the abutting unit, and deforms by abutting a second side surface of the fixed slit plate, wherein
the fixed slit plate is arranged in between the abutting unit and the deformation unit in a state where the fixed slit plate abuts to the abutting unit, by the deformation unit that has deformed.

2. The rotary encoder according to claim 1, wherein the axis holding unit and the fixed slit table are formed of different members, and
the fixed slit table has a second positioning unit that positions the rotary axis of the rotary axis member.

3. The rotary encoder according to claim 1, wherein the fixed slit table has a second positioning unit that positions the light receiving unit.

4. The rotary encoder according to claim 1, wherein the fixed slit table includes at least one projection positioned between the fixed slit plate and an attachment surface of the fixed slit table to position the fixed slit plate at a predetermined height above the fixed slit table.

* * * * *